(12) United States Patent
Sakai et al.

(10) Patent No.: US 10,986,263 B2
(45) Date of Patent: Apr. 20, 2021

(54) CALIBRATION METHOD OF VARIABLE FOCAL LENGTH LENS AND VARIABLE FOCAL LENGTH LENS DEVICE

(71) Applicant: MITUTOYO CORPORATION, Kanagawa (JP)

(72) Inventors: Hiroshi Sakai, Kanagawa (JP); Yutaka Watanabe, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/414,148

(22) Filed: May 16, 2019

(65) Prior Publication Data

US 2019/0356860 A1 Nov. 21, 2019

(30) Foreign Application Priority Data

May 21, 2018 (JP) .............................. JP2018-097186

(51) Int. Cl.

| H04N 5/232 | (2006.01) |
|---|---|
| G02B 7/04 | (2021.01) |
| H04N 17/00 | (2006.01) |
| G02B 3/14 | (2006.01) |
| G02B 26/00 | (2006.01) |

(52) U.S. Cl.
CPC ......... *H04N 5/232123* (2018.08); *G02B 3/14* (2013.01); *G02B 7/04* (2013.01); *G02B 26/004* (2013.01); *H04N 17/002* (2013.01)

(58) Field of Classification Search
CPC .. H04N 17/002; H04N 5/232123; G02B 3/14; G02B 7/04; G02B 26/004

USPC ......................................................... 348/187
See application file for complete search history.

(56) References Cited

U.S. PATENT DOCUMENTS

| 3,785,733 A * | 1/1974 | Bender ................. G03B 27/323 |
|---|---|---|
| | | 355/77 |
| 5,082,362 A * | 1/1992 | Schneiter ................. G02B 7/32 |
| | | 356/3.03 |
| 5,153,780 A * | 10/1992 | Jorgensen ................ G02B 5/10 |
| | | 359/853 |
| 9,417,123 B2 | 8/2016 | Yoshida et al. |

(Continued)

*Primary Examiner* — John W Miller
*Assistant Examiner* — Sihar A Karwan
(74) *Attorney, Agent, or Firm* — Greenblum & Bernstein, P.L.C.

(57) ABSTRACT

A calibration method of a variable-focal-length lens including a liquid lens unit whose focal-length is periodically varied in response to a periodic drive-signal includes: using a calibration tool having a plurality of height-different parts on a surface; preparing a calibration table by repeating outputting a drive-signal having a predetermined voltage to the variable-focal-length lens, detecting a surface image of the calibration tool using an image detector, detecting two points having maximum image contrast in the surface image, calculating a focal-depth from a difference in a focal-length between the two points; and recording the focal-depth and the voltage of the drive-signal in a corresponding combination, and retrieving a value of the voltage corresponding to a desired focal-depth from the calibration table to set the variable-focal-length lens at the desired focal-depth, and adjusting the voltage of the drive-signal outputted to the variable-focal-length lens based on the retrieved value.

5 Claims, 10 Drawing Sheets

(56) References Cited

U.S. PATENT DOCUMENTS

| | | | |
|---|---|---|---|
| 2001/0043333 A1* | 11/2001 | Groot | G01B 11/2441 356/511 |
| 2003/0090586 A1* | 5/2003 | Jan | H04N 5/217 348/335 |
| 2004/0046888 A1* | 3/2004 | Jan | G02B 13/06 348/335 |
| 2005/0013504 A1* | 1/2005 | Noma | G01C 11/02 382/255 |
| 2005/0046944 A1* | 3/2005 | Shenderova | G02B 5/1842 359/565 |
| 2005/0122400 A1* | 6/2005 | Kochi | G06T 5/006 348/207.99 |
| 2010/0177376 A1 | 7/2010 | Arnold et al. | |
| 2014/0204220 A1* | 7/2014 | Schmack | G03B 43/00 348/187 |
| 2020/0033666 A1* | 1/2020 | Li | G02B 3/14 |

\* cited by examiner

CALIBRATION METHOD OF VARIABLE FOCAL LENGTH LENS AND VARIABLE FOCAL LENGTH LENS DEVICE

The entire disclosure of Japanese Patent Application No. 2018-097186 filed May 21, 2018 is expressly incorporated by reference herein.

TECHNICAL FIELD

The present invention relates to a calibration method of a variable focal length lens and a variable focal length lens device, specifically, to a method of calibrating a variable focal length lens whose focal length is varied at a high speed.

BACKGROUND ART

An optical device in a form of a variable focal length lens device employing, for instance, a liquid lens system (also simply referred to as a "lens system" hereinafter) based on a principle disclosed in Patent Literature 1 (U.S. Patent Application Publication No. 2010/0177376) has been developed.

The liquid lens system includes a cylindrical oscillator made of a piezoelectric material that is immersed in a transparent liquid. An alternating-current (AC) voltage (usually in a sinusoidal wave) having a high frequency of about 70 KHz is applied as a drive signal to an oscillator.

When the drive signal is applied to an inner circumferential surface and an outer circumferential surface of the oscillator of the liquid lens system, the oscillator expands and contracts in a thickness direction thereof to oscillate the liquid inside the oscillator. Then, when the frequency of the drive signal is tuned to an intrinsic frequency of the liquid, a concentric standing wave is created in the liquid to form concentric regions of different refractive indexes around a center axis of the oscillator.

Accordingly, when light is introduced into the oscillator of the lens system along the center axis of the oscillator in this state, the light follows a diffusing or converging path depending on the refractive index of each of the concentric regions generated in a transparent liquid.

The variable focal length lens device includes the above-described liquid lens system and a focusing objective lens (e.g. a typical convex lens or lens group), which are disposed on a common optical axis. The liquid lens system, which is a packaged liquid lens unit, is installed in the variable focal length lens device.

When a parallel light enters a typical objective lens, the light having passed through the lens is focused at a focus position located at a predetermined focal length from the lens. In contrast, when a parallel light enters the lens system disposed coaxially with the objective lens, the light is diverged or converged by the lens system, so that the light having passed through the objective lens is focused at a position closer or farther than the original focus position (i.e. the focus position without the lens system).

Accordingly, the focus position of the variable focal length lens device can be controlled as desired within a predetermined range (i.e. a range with a predetermined variation width capable of being added to/subtracted from the focal length of the objective lens using the lens system) by increasing or decreasing an amplitude of the drive signal.

If the drive signal in the variable focal length lens device is sinusoidal wave, the focal length (focus position) of the variable focal length lens device also sinusoidally changes. At this time, when the amplitude of the drive signal is 0, the light passing through the lens system is not refracted and the focal length of the variable focal length lens device becomes equal to the focal length of the objective lens. When the amplitude of the drive signal is at a positive or negative peak, the light passing through the lens system is most greatly refracted and the focal length of the variable focal length lens device is most deviated from the focal length of the objective lens.

In order to obtain an image using the variable focal length lens device, an illumination signal is outputted in synchronization with a phase of the sinusoidal wave of the drive signal to perform a pulsed illumination.

By applying the pulsed illumination to an object while the pulsed illumination is focused on a predetermined focal length among the sinusoidally changing focal lengths, the image of the object at this focal length is detected. When the pulsed illumination is performed at a plurality of phases in one cycle and images are detected at timings corresponding to the phases, the images at a plurality of focal lengths can be simultaneously obtained.

Meanwhile, an EDOF image (Extended Depth of Focus image or an extended focal depth image) in focus over an entire variable range of the focal length can be obtained by a continuous illumination instead of the pulsed illumination.

Images are taken while the focal length is varied at a high speed under the continuous illumination. The images focused on the respective focal lengths over the entire focal-length-variable range are superimposed to acquire an image. An inverse calculation is applied to an out-of-focus component of the acquired image, which is estimated from the focal-length-variable range, to provide an EDOF image. Even when a measurement target is an uneven surface having different heights, a profile of unevenness can be detected.

In the variable focal length lens using the above-described liquid lens system, a refractive power (Diopter) is an important optical property.

The refractive power in optics means a refraction degree in an (axially rotationally symmetric) optical system such as a lens. The refractive power is also referred to as a lens power.

The refractive power $\varphi$ is represented by $\varphi=-n/f$, provided that a refractive index of a medium is represented by n and a focal length is represented by f. In other words, the refractive power $\varphi$ is equal to an reciprocal number of the focal length f in the air (n=1.000). As the variable focal length lens has the larger refractive power $\varphi$, a variable range of the focal length f is widened. Accordingly, a magnitude of the refractive power $\varphi$ can be represented by the variable range of the focal length f from the longest length to the shortest length (i.e., a distance from the farthest focus point to the nearest focus point), namely, a focal depth.

In the variable focal length lens using the liquid lens system, the refractive power $\varphi$ can be adjusted in principle by adjusting an amplitude of the applied drive signal (sinusoidal voltage).

In an ideal state, specifically in a proportional relationship between the amplitude of the drive signal and the refractive power $\varphi$ of the liquid lens system, the refractive power $\varphi$ of the liquid lens system can be accurately adjusted by controlling the voltage of the drive signal.

However, in view of the structure of the liquid lens system, the relationship between the actual refractive power $\varphi$ and the applied voltage is not exactly proportional. Further, the relationship between the refractive power $\varphi$ and the applied voltage differs depending on an individual liquid lens system, and also differs depending on a frequency of the drive signal. This makes it difficult to obtain a desired refractive power φ in the liquid lens system even when the drive signal is adjusted.

SUMMARY OF INVENTION

An object of the invention is to provide a calibration method of a variable focal length lens and a variable focal length lens device, which are capable of obtaining a desired refractive power by adjusting a drive signal.

According to an aspect of the invention, a calibration method of a variable focal length lens whose focal length is periodically varied in response to a periodic drive signal by using a variable focal length lens device, in which the variable focal length lens device includes: the variable focal length lens; an illuminator configured to illuminate a measurement target; an image detector configured to detect an image of the measurement target through the variable focal length lens; and a lens controller configured to output the drive signal to the variable focal length lens and control the illuminator and the image detector, includes: setting the measurement target in a form of a calibration tool having a plurality of height-different parts on a surface of the calibration tool; subsequently, preparing a calibration table by repeating outputting from the lens controller the drive signal having a predetermined voltage to the variable focal length lens, detecting a surface image of the calibration tool using the image detector, detecting two points whose image contrast is maximum in the surface image, calculating a focal depth from a difference in a focal length between the two points, and recording the focal depth and the voltage of the drive signal in a corresponding combination; and retrieving a value of the voltage corresponding to a desired focal depth from the calibration table to set the variable focal length lens at the desired focal depth of the focal depth, and adjusting the voltage of the drive signal to be outputted to the variable focal length lens on a basis of the retrieved value.

In the above aspect, the image detection and the calculation are repeated using the calibration tool, whereby the relationship between the voltage of the drive signal and the focal depth of the variable focal length lens can be recorded in the calibration table. Particularly, by detecting two points whose image contrast is maximum in the surface image of the calibration tool to obtain a difference between the two points or focal lengths (the longest focal length and the shortest focal length) corresponding to the positive and negative peaks of a waveform of the drive signal, the focal depth can be calculated based on the difference between the two points or focal lengths. Repeating of the above process reliably and easily enables to prepare the calibration table showing the focal depth or the refractive power of the variable focal length lens, and the corresponding drive signal voltage.

In order to set the variable focal length lens at a desired focal depth, with reference to the calibration table prepared in advance, the voltage corresponding to the desired focal depth is retrieved and the drive signal is adjusted to the obtained voltage. Accordingly, the variable focal length lens can be adjusted so as to have the desired focal depth. This adjustment of the drive signal allows the variable focal length lens to have the desired refractive power φ.

In the calibration method according to the above aspect of the invention, the calibration tool preferably includes a plurality of stepped surfaces having a predetermined height on the surface of the calibration tool.

In this arrangement, the plurality of stepped surfaces define a plurality of parts at different heights in the calibration tool, thereby being usable for calculation of the image contrast of the surface image. Herein, the stepped surfaces reliably provide a predetermined area for the surface image of the calibration tool and reliably and easily enable to calculate the image contrast.

It should be noted that the calibration tool may be, for instance, in a form of a block having an inclined surface in which parts at the same height are at the same focal length. However, when the calibration tool is arranged to have stepped surfaces as described in the above arrangement, each of the stepped surfaces can have a predetermined area at the same focal length, which is effective in that a reflected light amount can be reliably obtained to reliably and easily calculate the image contrast.

In the calibration method according to the above aspect of the invention, preferably, the image detector detects an EDOF image while the illuminator continuously illuminates the measurement target, and the EDOF image is used as the surface image of the calibration tool for preparing the calibration table.

In the above arrangement, the detected EDOF image includes the superimposed image data focused on the focus position varying in response to the drive signal. If the drive signal is a typical sinusoidal wave, a variation of a value of the drive signal Cf is small at and near the positive peak and the negative peak where an increase or a decrease in the value is reversed. Accordingly, the EDOF image includes many image data of the drive signal at and near the positive peak and the negative peak. When calculating the image contrast of the EDOF image under these circumstances, two points of the drive signal Cf at and near the positive peak and the negative peak, whose image data is included in the EDOF image at the high ratio, emerge as top two points respectively having the highest and second highest image contrast. Accordingly, the longest focal length and the shortest focal length are selected by selecting the top two points, and the focal depth can be obtained from the variation width (the range capable of being set as the focal length) between the top two points.

Further, in the above arrangement, the image data corresponding to the positive peak and the negative peak of the drive signal can be easily obtained while using the continuous illumination without using an expensive component such as a pulsed light illuminator.

In the calibration method according to the above aspect of the invention, preferably, preferably, the illuminator applies pulsed illumination to the measurement target at a timing corresponding to each of a positive peak and a negative peak of the drive signal; and the image detector detects a surface image of the calibration tool as the measurement target to which the pulsed illumination is applied.

In the above arrangement, the detected surface image of the calibration tool is a superimposed one of the two image data obtained by applying the pulsed illumination at the positive peak and the negative peak of the drive signal. The focal length of each of the two image data is obtained by calculating the image contrast of the surface image. The focal depth can be obtained from a difference between the focal lengths.

Accordingly, the longest focal length and the shortest focal length can be easily and reliably obtained by applying the pulsed illumination at the positive peak and the negative peaks of the drive signal.

According to another aspect of the invention, a variable focal length lens device includes: a variable focal length lens whose focal length is periodically varied in response to a periodic drive signal; an illuminator configured to illuminate a measurement target; an image detector configured to detect a surface image of the measurement target through the variable focal length lens; a lens controller configured to output the drive signal to the variable focal length lens and control the illuminator and the image detector; and a calibration controller configured to adjust a voltage of the drive signal outputted by the lens controller, in which the calibration controller prepares a calibration table by repeating outputting from the lens controller the drive signal having a predetermined voltage to the variable focal length lens, detecting the surface image of the measurement target using the image detector, detecting two points whose image contrast is maximum in the surface image, calculating a focal depth from a difference in a focal length between the two points, and recording the focal depth and the voltage of the drive signal in a corresponding combination, and the calibration controller retrieves a value of the voltage corresponding to a desired focal depth from the calibration table to set the variable focal length lens at the desired focal depth of the focal depth, and adjusts the voltage of the drive signal to be outputted to the variable focal length lens on a basis of the retrieved value.

In the above aspect of the invention, the same advantages as described above in the calibration method of the variable focal length lens can be obtained by setting the measurement target in a form of the calibration tool having the plurality of parts different in height formed on a surface of the calibration tool, and operating the calibration controller.

According to the above aspects of the invention, a calibration method of a variable focal length lens and a variable focal length lens device, which are capable of obtaining a desired refractive power by adjusting a drive signal, can be provided.

DESCRIPTION OF EMBODIMENT(S)

An exemplary embodiment of the invention will be described below with reference to the attached drawings.
Variable Focal Length Lens Device 1

Figure 1:
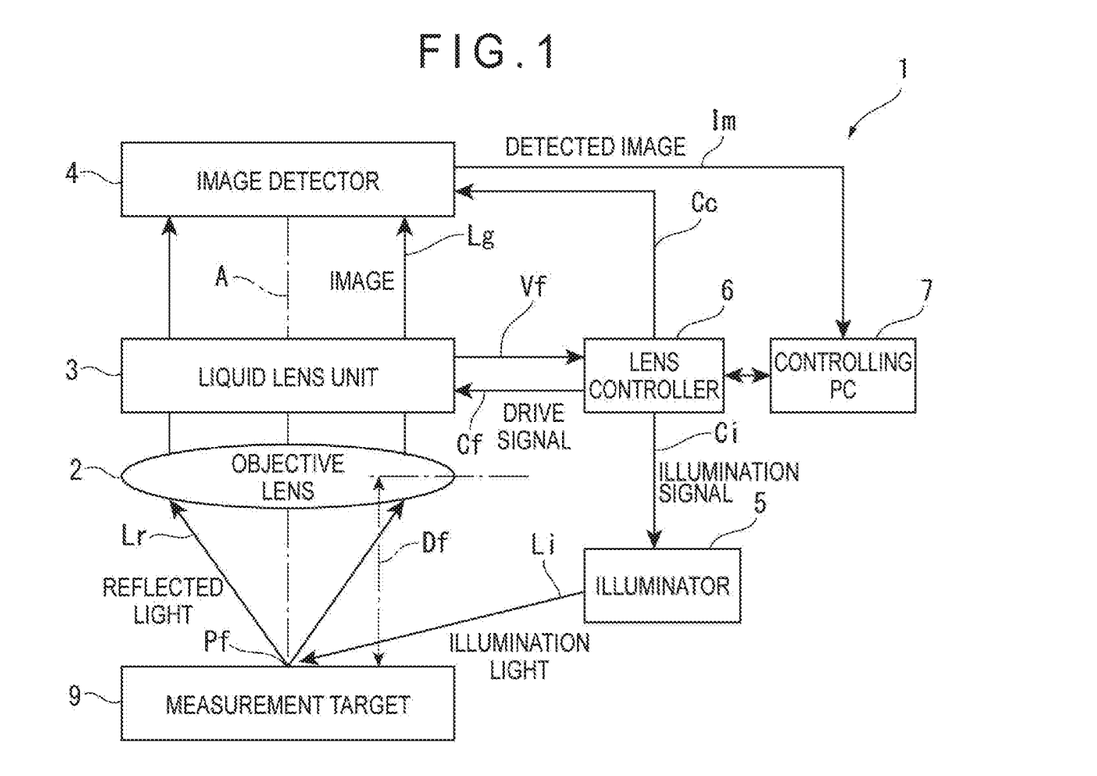
FIG. 1 schematically shows an exemplary embodiment of the invention.

As shown in FIG. 1, a variable focal length lens device 1 is configured to detect an image of a surface of a measurement target 9 while varying a focal length.

Accordingly, the variable focal length lens device 1 includes: an objective lens 2 and a liquid lens unit 3 which are disposed on a common optical axis A intersecting with the surface of the measurement target 9; an image detector 4 configured to detect the image of the measurement target 9 through the objective lens 2 and the liquid lens unit 3; and an illuminator 5 configured to illuminate the surface of the measurement target 9.

The objective lens 2 and the liquid lens unit 3 define a variable focal length lens in the variable focal length lens device 1.

The variable focal length lens device 1 further includes: a lens controller 6 configured to control the liquid lens unit 3, the image detector 4 and the illuminator 5; and a controlling PC 7 configured to operate the lens controller 6.

An existing personal computer is used as the controlling PC 7. The desired function of the controlling PC 7 is achieved by running a predetermined control software on the controlling PC 7. The controlling PC 7 is also configured to capture and process an image from the image detector 4.

An existing convex lens is used as the objective lens 2.

The image detector 4 includes an existing charge coupled device (CCD) image sensor, other type of a camera or the like, and is configured to receive an image Lg and output the image Lg to the controlling PC 7 in a form of a detected image Im of a predetermined format.

The illuminator 5 includes a light-emitting element such as a light emitting diode (LED). The illuminator 5 is configured to emit an illumination light Li to illuminate the surface of the measurement target 9 in response to an illumination signal Ci from the lens controller 6. The illumination light Li is reflected at the surface of the measurement target 9. A reflected light Lr from the surface of the measurement target 9 forms the image Lg through the objective lens 2 and the liquid lens unit 3.

The liquid lens unit 3, in which a liquid lens system is provided, is configured to change a refractive index thereof in response to a drive signal Cf inputted from the lens controller 6. The drive signal Cf is a sinusoidal AC signal of a frequency capable of forming a standing wave in the liquid lens unit 3.

A focal length Df to a focus position Pf of the variable focal length lens device 1 can be changed as desired based on a focal length of the objective lens 2 by changing the refractive index of the liquid lens unit 3.
Liquid Lens Unit 3

Figure 2:
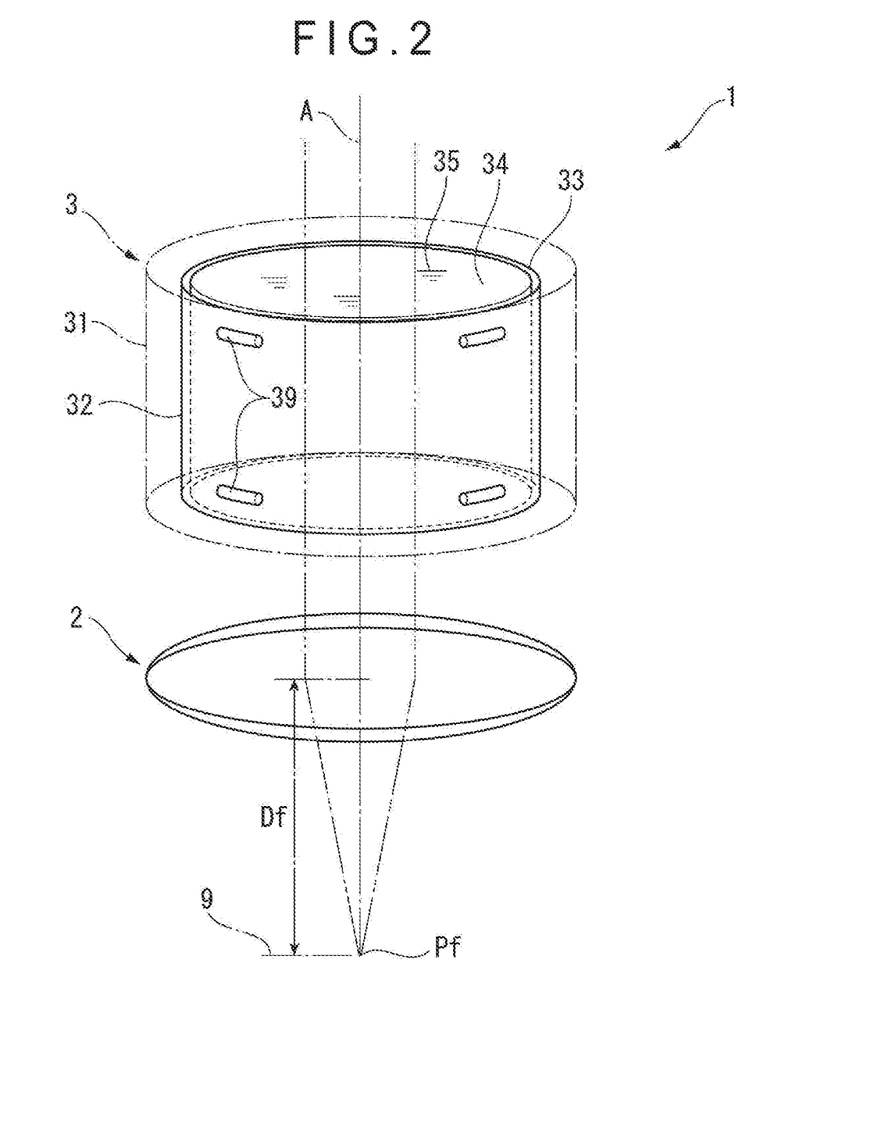
FIG. 2 schematically shows a configuration of a liquid lens unit in the exemplary embodiment.

As shown in FIG. 2, the liquid lens unit 3 includes a cylindrical case 31 and a cylindrical oscillator 32 disposed inside the case 31. The oscillator 32 includes an outer circumferential surface 33 and is supported by an elastomeric spacer 39 interposed between the outer circumferential surface 33 and an inner circumferential surface of the case 31.

The oscillator 32 is a cylindrical component made from a piezoelectric material. The oscillator 32 is configured to oscillate in a thickness direction thereof when the AC voltage of the drive signal Cf is applied between the outer circumferential surface 33 and an inner circumferential surface 34 of the oscillator 32.

An interior of the case 31 is filled with a highly transparent liquid 35. The oscillator 32 is entirely immersed in the liquid 35 and an interior of the cylindrical oscillator 32 is filled with the liquid 35. The frequency of the AC voltage of the drive signal Cf is tuned to a frequency (e.g., 70 KHz) capable of forming a standing wave in the liquid 35 inside the oscillator 32.

Figure 3:
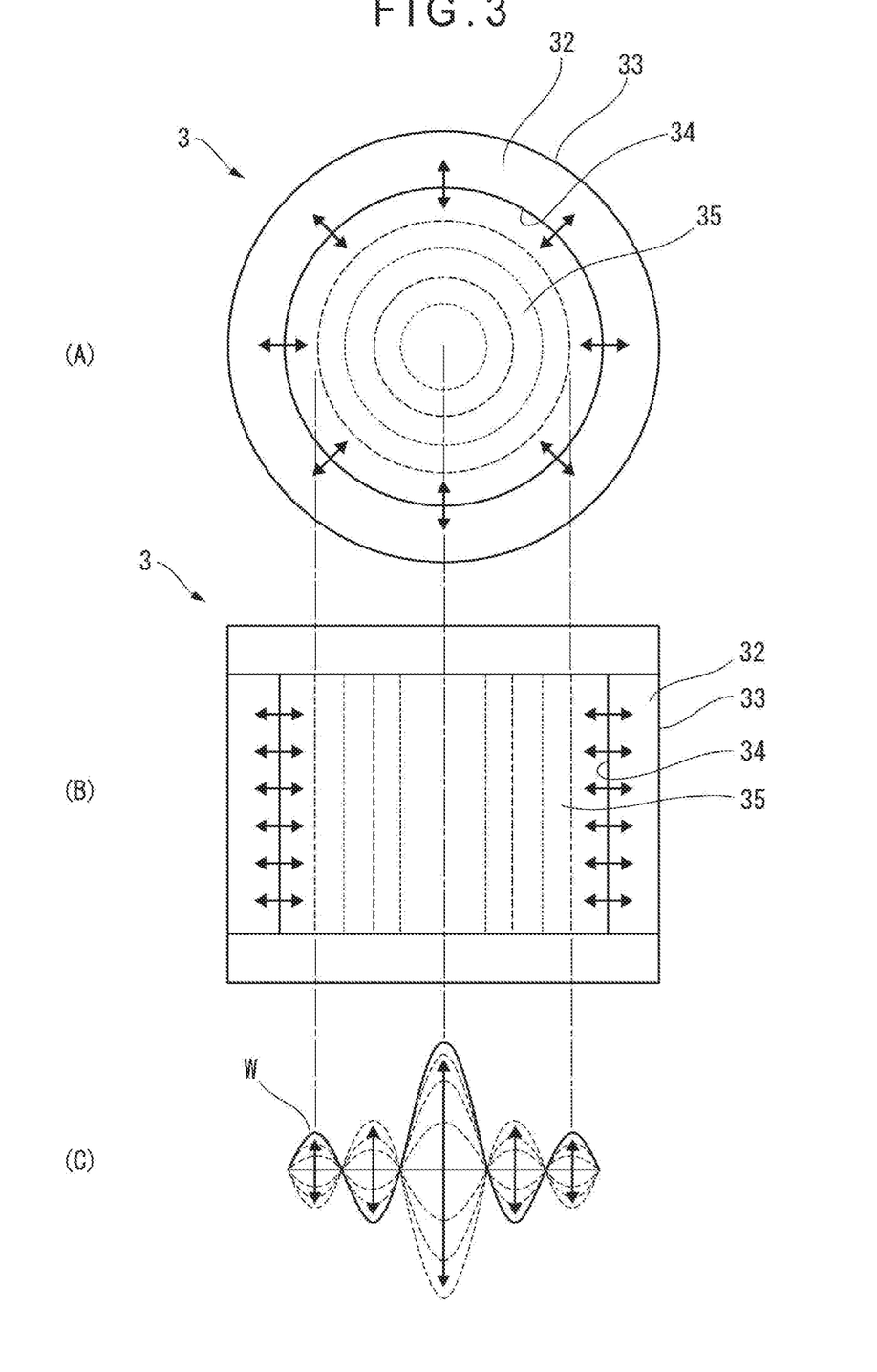
FIG. 3 schematically shows an oscillation state of the liquid lens unit in the exemplary embodiment.

As shown in FIG. 3, when the oscillator 32 of the liquid lens unit 3 is oscillated, a standing wave is formed in the liquid 35 to create concentric regions with alternating refractive indexes (see FIGS. 3(A) and 3(B)).

A relationship between a distance (radius) from a central axis of the liquid lens unit 3 and the refractive index of the liquid 35 at this time is represented by a refractive index distribution W shown in FIG. 3(C).

Figure 4:
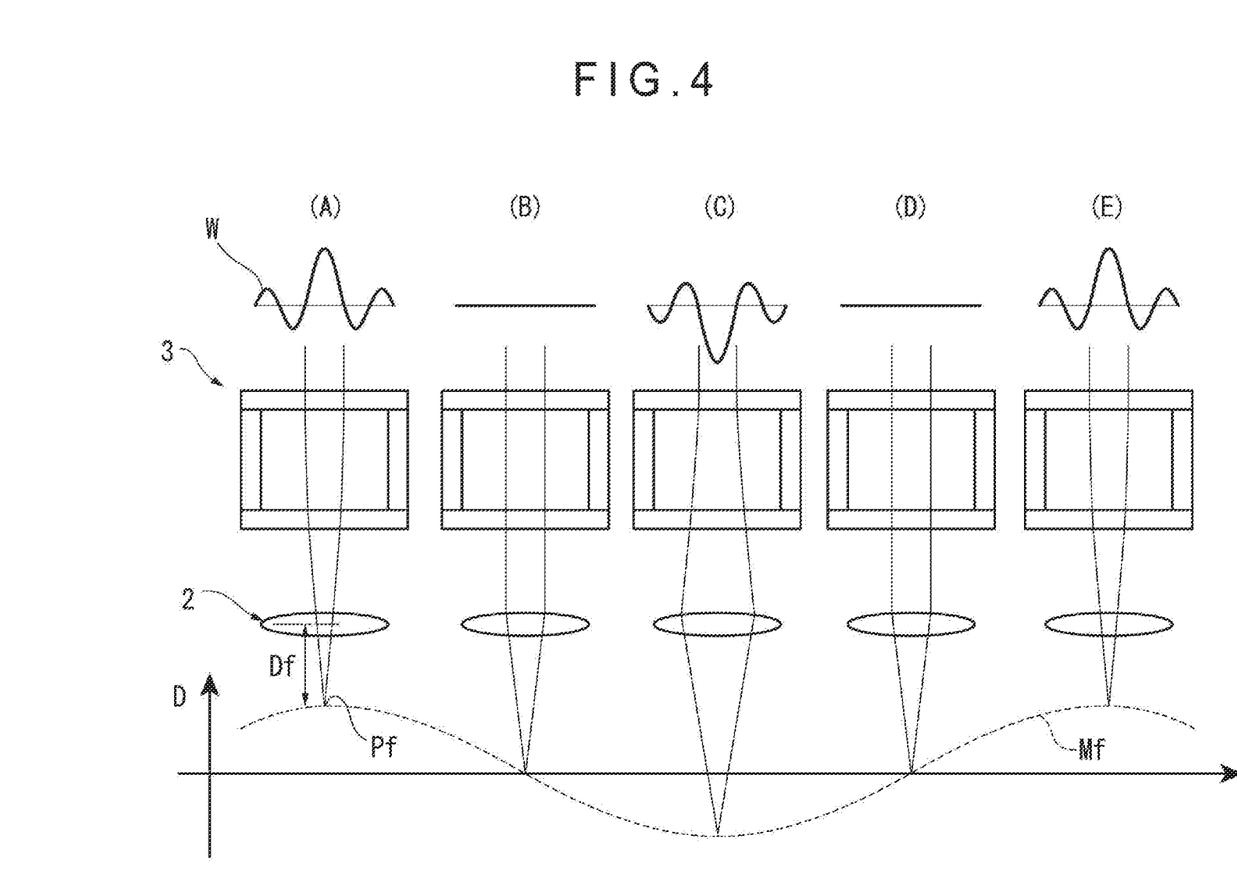
FIG. 4 schematically shows a focal length of the liquid lens unit in the exemplary embodiment.

As shown in FIG. 4, since the drive signal Cf is a sinusoidal AC signal, a variation width of the refractive index distribution W of the liquid 35 in the liquid lens unit 3 also changes in accordance with the drive signal Cf. The refractive index of the concentric regions formed in the liquid 35 sinusoidally changes to cause a sinusoidal variation in the focal length Df to the focus position Pf.

A difference between the maximum and minimum values in the refractive index distribution W is maximized in the state shown in FIG. 4(A), where the liquid lens unit 3 converges the light passing therethrough, the focus position Pf is located closest to the lens system 3 and the focal length Df is shortest.

The refractive index distribution W is flat in the state shown in FIG. 4(B), where the liquid lens unit 3 lets the light through without refraction, and the focus position Pf and the focal length Df are at reference values.

The difference between the maximum and minimum values in the refractive index distribution W is maximized in the state shown in FIG. 4(C) with a polarity reverse to that in FIG. 4(A)), where the liquid lens unit 3 diffuses the light passing therethrough, the focus position Pf is located remotest from the liquid lens unit 3 and the focal length Df is largest.

The refractive index distribution W is again flat in the state shown in FIG. 4(D), where the liquid lens unit 3 lets the light through without refraction, and the focus position Pf and the focal length Df are at the reference values.

The refractive index distribution W in FIG. 4(E) is returned to the state in FIG. 4(A), and the same variation in the refractive index distribution W will be repeated thereafter.

As described above, the drive signal Cf of the variable focal length lens device 1 is a sinusoidal AC signal and the focus position Pf and the focal length Df also sinusoidally changes as shown in a focal-point-variation waveform Mf in FIG. 4.

When the pulsed illumination is applied to the measurement target 9 at the focus position Pf at any timing (i.e., at any phase) in the focal-point-variation waveform Mf, the image of the illuminated measurement target 9 at the focus position Pf at the focal length Df at any timing can be obtained.

Meanwhile, the continuous illumination may be conducted instead of the pulsed illumination while the focus position Pf is varied in line with the focal-point-variation waveform Mf, and the image of the measurement target 9 is continuously detected, thereby providing an EDOF image of the measurement target 9, in which the in-focus images of the measurement target 9 at the focal length Df ranging from the shortest (a state of FIG. 4(A)) to the longest (a state of FIG. 4(C)) are superimposed.

Lens Controller 6

Referring back to FIG. 5, the oscillation of the liquid lens unit 3, the illumination of the illuminator 5 and the image-detection of the image detector 4 of the variable focal length lens device 1 are controlled based on the drive signal Cf, the illumination signal Ci and an image-detection signal Cc from the lens controller 6. At this time, an effective power, a drive current or the like applied to the liquid lens unit 3 is returned as an oscillation state Vf to the lens controller 6.

Figure 5:
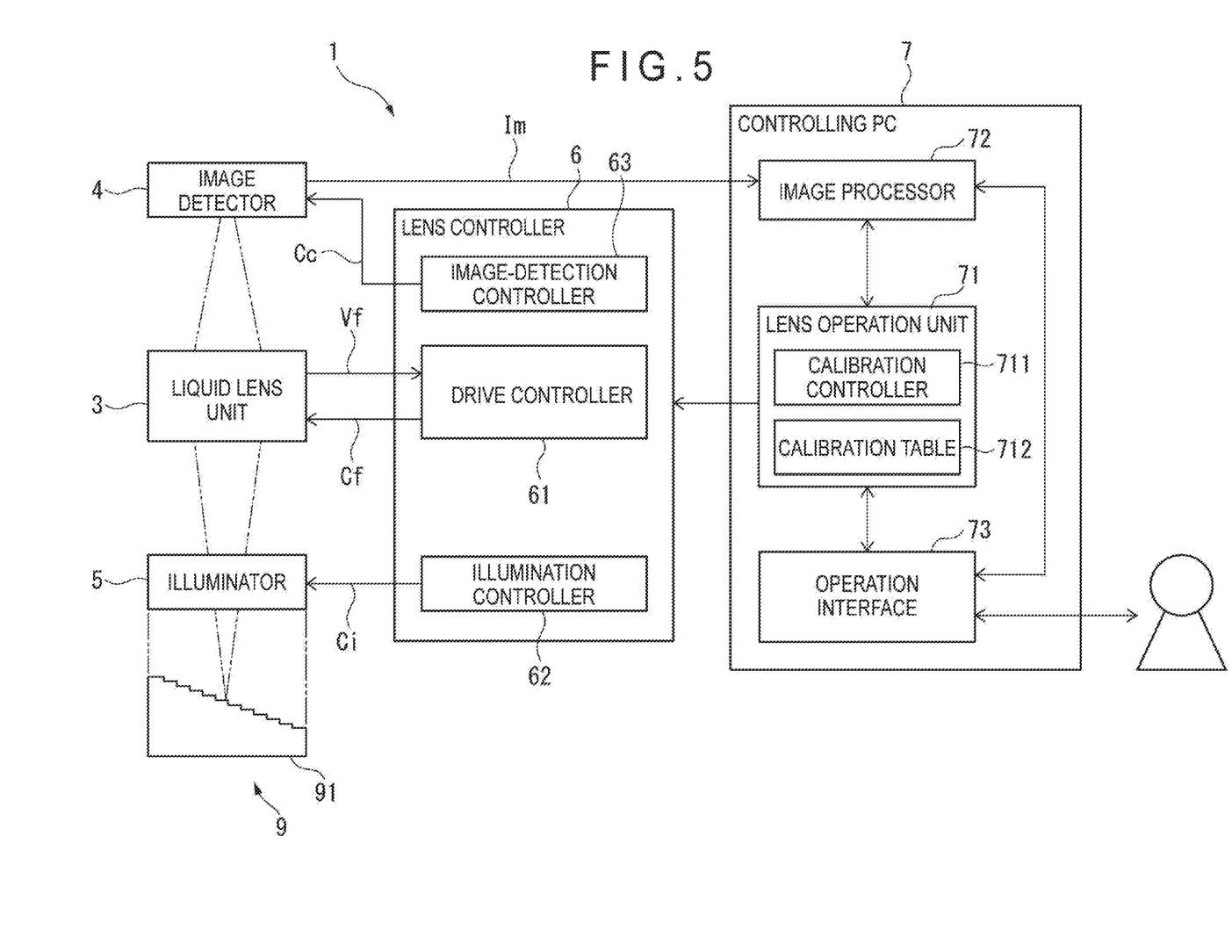
FIG. 5 is a block diagram showing a control configuration in the exemplary embodiment.

The lens controller 6 includes: a drive controller 61 configured to output the drive signal Cf to the liquid lens unit 3; an illumination controller 62 configured to output the illumination signal Ci to the illuminator 5; and an image-detection controller 63 configured to output the image-detection signal Cc to the image detector 4.

The controlling PC 7 is connected in order to, for instance, configure image-detection conditions such as the setting of the lens controller 6.

Controlling PC 7

The controlling PC 7 includes: a lens operation unit 71 configured to operate the lens controller 6 (e.g. to configure the setting of the image-detection conditions); an image processor 72 configured to capture and process the detected image Im from the image detector 4; and an operation interface 73 configured to receive a user's operation on the variable focal length lens device 1.

The lens operation unit 71 includes a calibration controller 711 and a calibration table 712 in the exemplary embodiment.

While a calibration tool 91 is set as the measurement target 9 of the variable focal length lens device 1, the calibration controller 711 is driven to prepare the calibration table 712 (see FIG. 9) in which a desired refractive power (focal depth) and a voltage of the corresponding drive signal Cf are recorded.

A to-be-measured measurement target 9 is set, and the controlling PC 7 having the prepared calibration table 712 retrieves the voltage corresponding to the desired refractive power from the calibration table 712 and adjusts the voltage of the drive signal Cf to be outputted by the lens controller 6, so that the desired refractive power can be obtained at the liquid lens unit 3.

Calibration Tool 91

Figure 6:
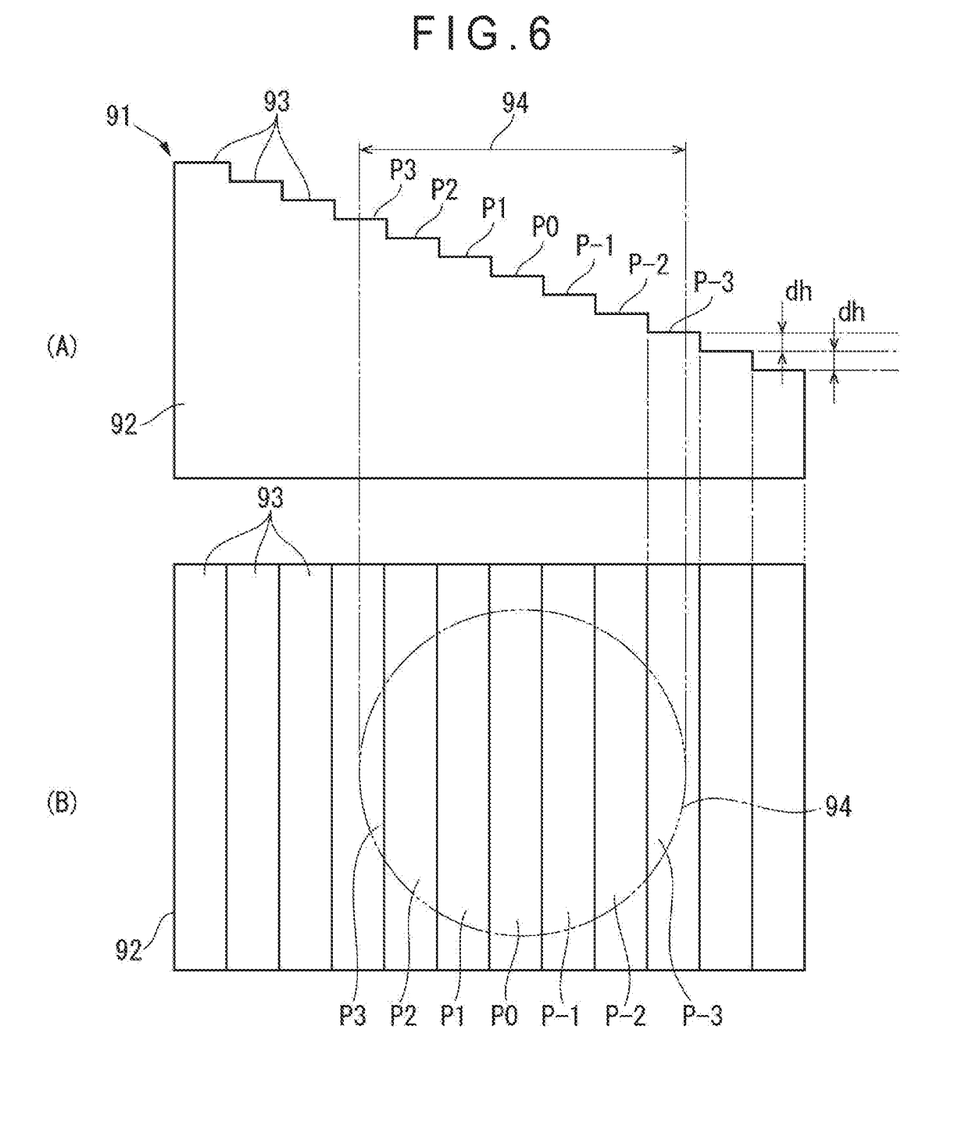
FIG. 6 shows a lateral profile (A) and a planar shape (B) of a calibration tool in the exemplary embodiment.

FIG. 6 shows a calibration tool 91 used in the exemplary embodiment. FIG. 6(A) shows a lateral profile (A) of the calibration tool 91. FIG. 6(B) shows a planar shape of the calibration tool 91.

As shown in FIG. 6, the calibration tool 91 includes: a main body 92 shaped in a block made of an inorganic material (e.g., metal) or a synthetic resin; and multiple stepped surfaces 93 formed on an upper surface of the main body 92. A step height dh between the adjacent stepped surfaces 93 is fixed.

When the calibration tool 91 is set in the variable focal length lens device 1 and the image detector 4 detects an image of the calibration tool 91, the image detector 4 can detect an image (e.g., a surface image 94) including images of plural ones of the stepped surfaces 93.

In the following description about the stepped surfaces 93 whose images are taken as the surface image 94, the stepped surface 93 at the center of the surface image 94 is defined as a reference stepped surface P0, the stepped surfaces 93 positioned higher than the reference stepped surface P0 are sequentially defined as stepped surfaces P1, P2, P3 etc., and the stepped surfaces 93 positioned lower than the reference stepped surface P0 are sequentially defined as stepped surfaces P-1, P-2, P-3 etc. It should be noted that, when more stepped surfaces 93 are included in the surface image 94, the stepped surfaces 93 are sequentially defined as stepped surfaces P4, P5 etc or P-4, P-5 etc.

In the exemplary embodiment, the illuminator 5 continuously illuminates the calibration tool 91, whereby the image of the calibration tool 91 detected by the image detector 4 is provided as the EDOF image.

Specifically, image data of the surface image 94 is obtained by superimposing all the image data focused on the respective reference stepped surface P0, stepped surfaces P1 to P3 and stepped surfaces P-1 to P-3. The image data of the surface image 94 is usable as image data focused on any stepped surface Pn in a range from the stepped surface P3 having the minimum focal length to the stepped surface P-3 having the maximum focal length. It should be noted that image data focused on one of the stepped surfaces (e.g., the stepped surface P1) does not focus on the other stepped surfaces (e.g., the stepped surface P2), in other words, the image data also contains so-called out-of-focus image data.

Preparation Procedure of Calibration Table 712

Figure 7:
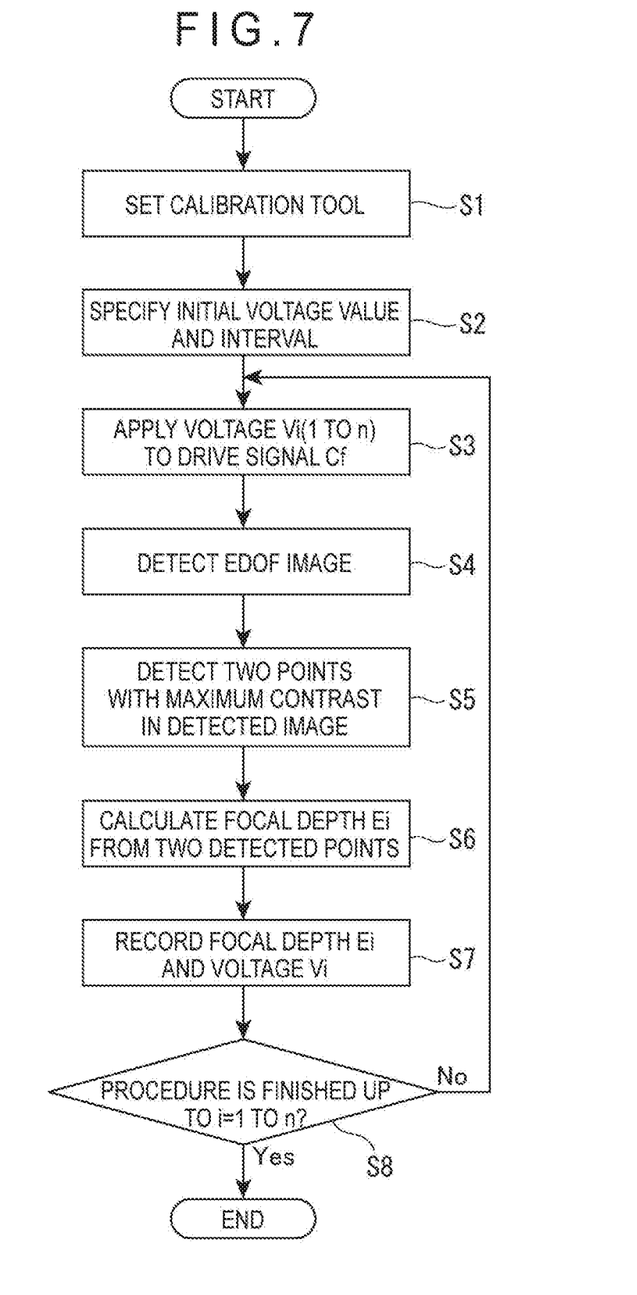
FIG. 7 is a flowchart showing a calibration procedure in the exemplary embodiment.

FIG. 7 shows a preparation procedure of the calibration table 712.

As shown in FIG. 7, when an operator starts the calibration controller 711 using the operation interface 73 of the controlling PC 7, the calibration controller 711 guides setting of the calibration tool 91 by screen display or the like (Step S1).

When the operator sets the calibration tool 91 in the variable focal length lens device 1 and inputs the setting of the calibration tool 91 using the operation interface 73, the calibration controller 711 guides inputting of an initial voltage value Vo and an interval (variation width dV) by screen display or the like (Step S2).

Figure 9:
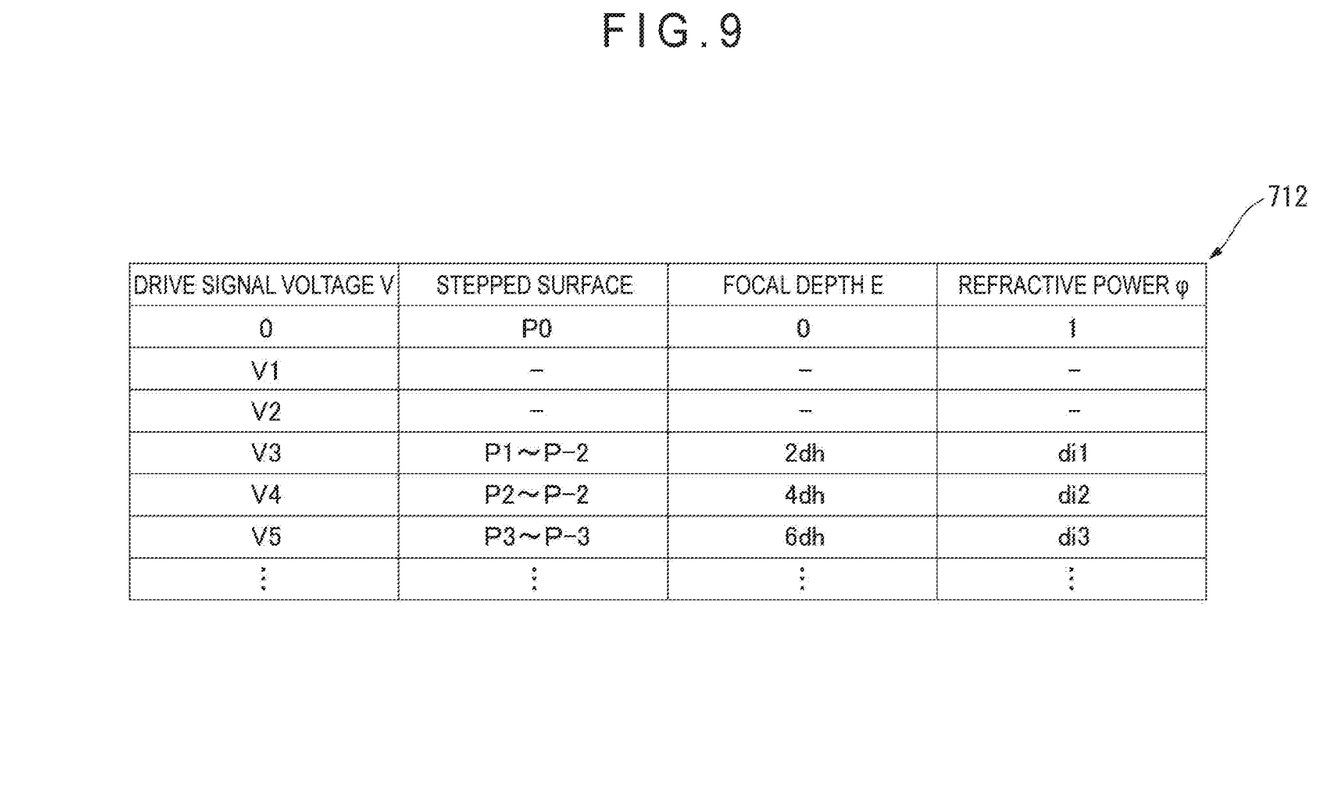
FIG. 9 shows a calibration table obtained by the calibration process in the exemplary embodiment.

When the operator inputs the initial voltage value Vo and the variation width dV using the operation interface 73, the calibration controller 711 repeats measuring a focal depth corresponding to a voltage Vi with respect to each of voltages obtained by the voltage Vi=Vo+idV (i=0 to n) (Steps S3 to S8), thereby preparing the calibration table 712 (see FIG. 9).

Specifically, the calibration controller 711 controls the lens controller 6 to apply the drive signal Cf of the voltage Vi to the liquid lens unit 3 (Step S3), and controls the image detector 4 to detect the surface image 94 (EDOF image) of the calibration tool 91 (Step S4). Subsequently, the calibration controller 711 detects two points (two stepped surfaces 93) whose image contrast is maximum in the surface image 94 (Step S5), calculates a focal depth Ei of each of the two points on a basis of a difference in the focal length between the two points (Step S6), and records the obtained focal depths Ei and the voltages Vi of the drive signal Cf in a corresponding combination (Step S7). The above Steps S3 to S7 are repeated until i=1 to n is satisfied (Step S8), whereby the calibration table 712 can be prepared.

Figure 8:
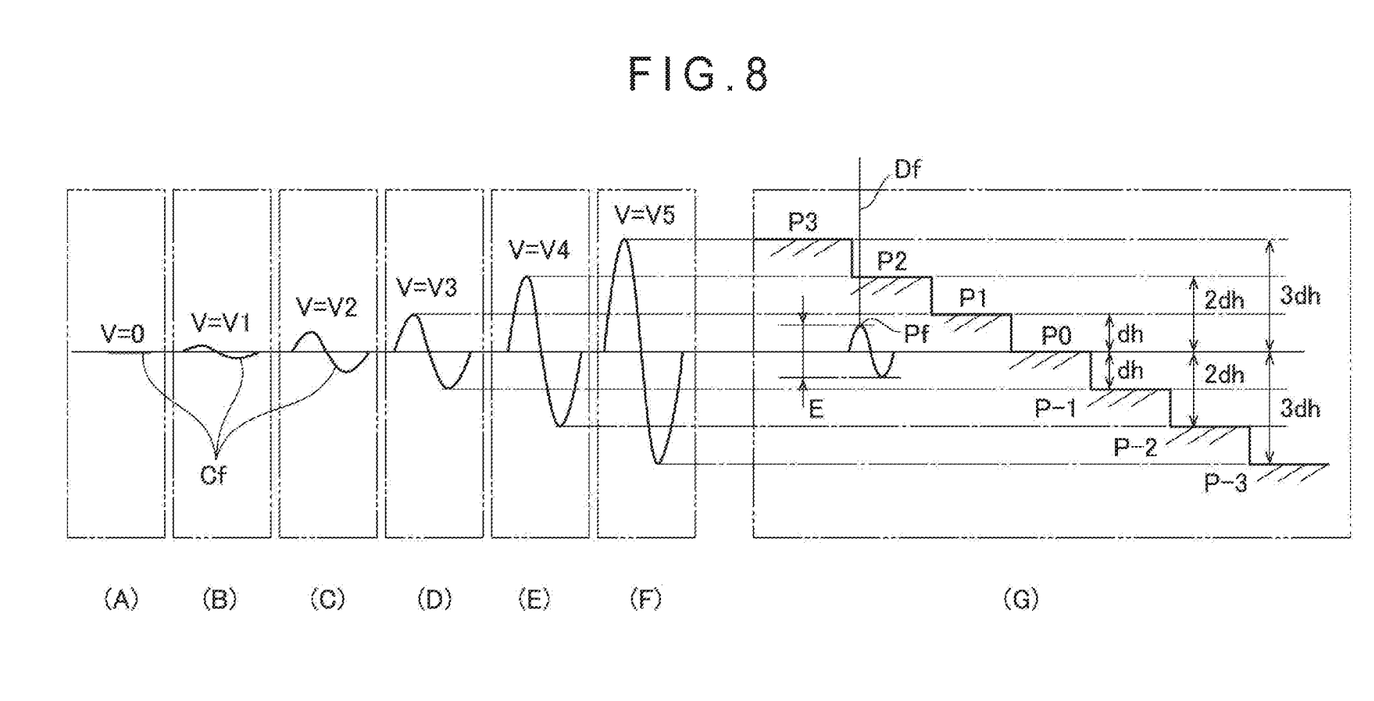
FIG. 8 schematically shows a calibration process in the exemplary embodiment.

FIG. 8 shows a relationship between the voltage V of the drive signal Cf and the detected two stepped surfaces 93 when preparing the calibration table 712.

As shown in FIG. 8, the voltage V of the drive signal Cf applied to the liquid lens unit 3 (Step S3 in FIG. 7) is gradually increased from V=0 in a part (A), V=V1 in a part (B) and V=V2 in a part (C) in FIG. 8.

When the voltage of the drive signal Cf is zero (V=0), the liquid lens unit 3 is not driven and the focal length Df (see FIG. 4) of the variable focal length lens (the liquid lens unit 3 and the objective lens 2) is unvaried at the central variation width, so that the focus position Pf (see FIG. 4) stays on the reference stepped surface P0 at a part (G) in FIG. 8.

When the voltage V of the drive signal Cf is increased to V1 and V2, the variation width of the focal length Df is less than the step height dh (both in positive and negative directions) and stays within the range of the step height dh (range including the stepped surfaces P1 and P-1 adjacent to the reference stepped surface P0) at the part (G).

When the voltage V of the drive signal Cf is further increased to reach the voltage V=V3, the variation width of the focal length Df exceeds the range of the step height dh at the part (G) and the variable focal length lens is also focused on the adjacent stepped surfaces P1 and P-1. At this time, the voltage V=V3 of the drive signal Cf leads to the focal depth E=dh×2=2 dh.

Likewise, when the voltage of the drive signal Cf reaches V=V4, the variation width of the focal length Df exceeds the step height 2 dh at the part (G) and the variable focal length lens is focused on the stepped surfaces P2, P-2, the voltage V=V4 of the drive signal Cf leads to the focal depth E=2 dh×2=4 dh. When the voltage of the drive signal Cf reaches V=V5, the variation width of the focal length Df exceeds the step height 3 dh at the part (G) and the variable focal length lens is focused on the stepped surfaces P3, P-3, the voltage V=V5 of the drive signal Cf leads to the focal depth E=3 dh×2=6 dh.

The calibration table 712 can be prepared by recording the focal depth Ei and the voltage Vi of the drive signal Cf in a corresponding combination as described above (Step S7 in FIG. 7).

FIG. 9 shows an example of the calibration table 712 prepared according to an example shown in FIG. 8.

As shown in FIG. 9, when the voltage of the drive signal Cf is V=0, light is focused on the reference stepped surface P0, and the focal depth E=0 and the refractive power $\varphi=1$.

When the voltage of the drive signal Cf is V=V3, light is focused on the stepped surfaces P1 to P-1 and the focal depth E=2 dh and the refractive power $\varphi=di1$.

When the voltage of the drive signal Cf is V=V4, light is focused on the stepped surfaces P2 to P-2 and the focal depth E=4 dh and the refractive power $\varphi=di2$.

When the voltage of the drive signal Cf is V=V5, light is focused on the stepped surfaces P3 to P-3 and the focal depth E=6 dh and the refractive power $\varphi=di3$.

Provided that the calibration table 712 is prepared, when the focal depth E or the refractive power $\varphi$ required by the variable focal length lens device 1 is given, the corresponding focal depth E or refractive power $\varphi$ is searched for in the calibration table 712 to retrieve the corresponding drive signal voltage V, and the drive signal voltage V is set as the drive signal Cf of the lens controller 6, whereby the variable focal length lens device 1 can be adjusted at a desired focal depth E or refractive power $\varphi$.

According to the exemplary embodiment, advantages as follows are obtainable.

In the exemplary embodiment, the relationship between the voltage V of the drive signal Cf and the focal depth E of the variable focal length lens (the liquid lens unit 3 and the objective lens 2) can be recorded in the calibration table 712 (see FIG. 9) by repeating the image detection and the calculation using the calibration tool 91 (Steps S3 to S7 in FIG. 7).

Particularly, the focal depth E can be calculated from a difference between two focal lengths (the longest focal length and the shortest focal length) corresponding to positive and negative peaks of a waveform of the drive signal Cf by detecting the two points whose image contrast is maximum in the surface image of the calibration tool 91 (Step S5 in FIG. 7) and summing up the step heights dh of the stepped surfaces 93 of the calibration tool 91.

Repeating of the above process reliably and easily enables to prepare the calibration table 712 showing the focal depth E and the refractive power $\varphi$ of the variable focal length lens and the corresponding drive signal voltage V.

In order to set the variable focal length lens at a desired focal depth, with reference to the calibration table 712 prepared in advance, the voltage V corresponding to the desired focal depth E is retrieved and the drive signal Cf is adjusted to the obtained the voltage V. Accordingly, the variable focal length lens can be adjusted so as to provide the desired focal depth E. This adjustment of the drive signal Cf allows the variable focal length lens to have the desired refractive power φ.

The calibration tool 91 used in the exemplary embodiment has many stepped surfaces 93 each having a predetermined height (i.e., the step height dh) on the surface of the calibration tool 91. Accordingly, the multiple stepped surfaces 93 form multiple parts having different heights in the calibration tool 91, thereby being usable for calculation of the image contrast of the surface image. Herein, the stepped surfaces 93 reliably provide a predetermined area for the surface image of the calibration tool 91 and reliably and easily enables to calculate the image contrast.

Further, since the stepped configuration of the calibration tool 91 defines the stepped surfaces 93, each of which can have a predetermined area at the same focal length (at a predetermined height to be the same focal length), so that a reflected light amount can be reliably obtained to reliably and easily calculate the image contrast.

At the image detection (Step S4 in FIG. 7) in the exemplary embodiment, the image detector 4 detects the EDOF image while the illuminator 5 continuously illuminates the calibration tool 91, and the detected EDOF image is used as the surface image of the calibration tool 91 for preparing the calibration table 712.

The EDOF image includes the superimposed image data focused on the focus position Pf varying in response to the drive signal Cf. If the drive signal Cf is a typical sinusoidal wave, a variation of a value of the drive signal Cf is small at and near a positive peak and a negative peak where an increase or a decrease in the value is reversed. Accordingly, a component ratio of the image data of the drive signal Cf at and near the positive peak and the negative peak is high in the EDOF image. When calculating the image contrast of the EDOF image under these circumstances, two points of the drive signal Cf at and near the positive peak and the negative peak, whose image data is included in the EDOF image at the high ratio, emerge as top two points respectively having the highest and second highest image contrast. Accordingly, the longest focal length Df and the shortest focal length Df are selected by selecting the top two points, and the focal depth E can be obtained from the variation width (the range capable of being set as the focal length) between the top two points.

As described in the exemplary embodiment, the image data corresponding to the positive peak and the negative peak of the drive signal Cf can be easily obtained while using the continuous illumination without using an expensive component such as a pulsed light illuminator.

Other Exemplary Embodiment(s)

Figure 10:
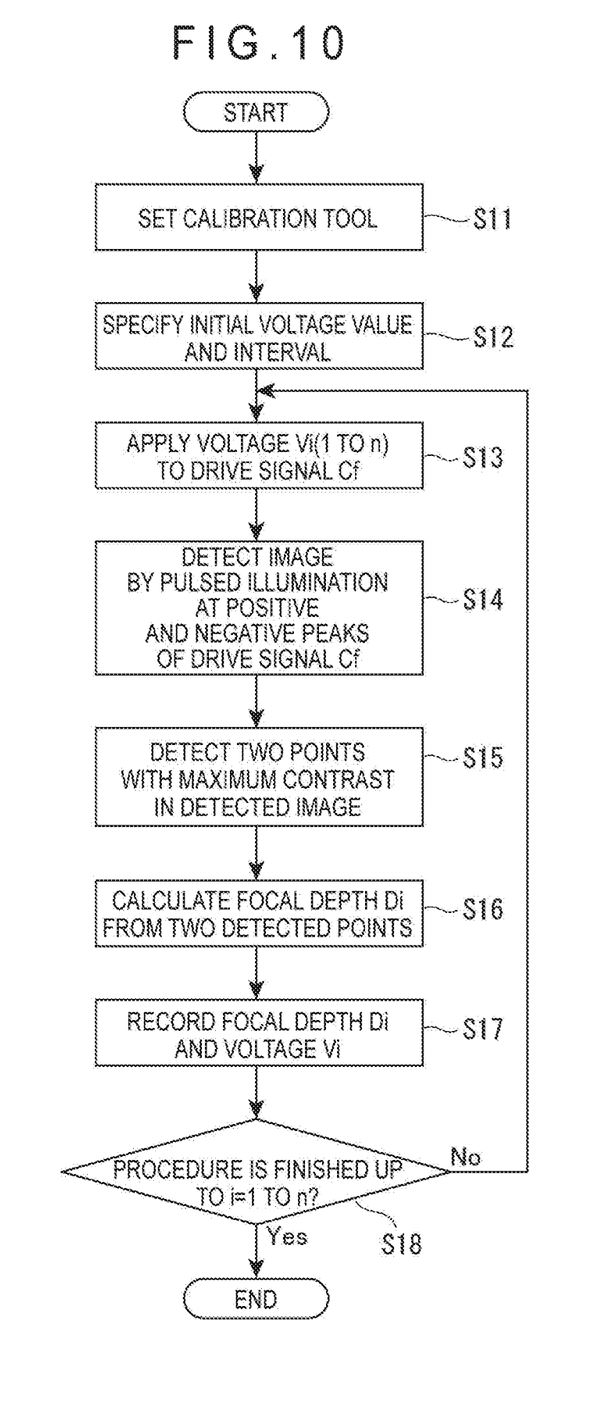
FIG. 10 is a flowchart showing a calibration procedure in another exemplary embodiment of the invention.

FIG. 10 shows a preparation procedure of the calibration table 712 according to another exemplary embodiment of the invention.

Basic components of a variable focal length lens device in this exemplary embodiment are the same as the above-described variable focal length lens device 1. Accordingly, the description of the common components shown in FIGS. 1 to 6, 8 and 9 is omitted. Different components will be described below.

In the above exemplary embodiment, the illuminator 5 is a typical illuminator configured to perform a continuous illumination. However, in this exemplary embodiment, the illuminator 5 is a pulsed light illuminator capable of emitting a pulsed light at any phase in a waveform of the drive signal Cf.

The preparation procedure of the calibration table 712 to be executed by the calibration controller 711 of the controlling PC 7 is different from the procedure described in the above exemplary embodiment.

Steps S11 to S13 in FIG. 10 are the same as Steps S1 to S3 in FIG. 7. Moreover, Steps S15 to S18 in FIG. 10 are the same as Steps S5 to S8 in FIG. 7. In other words, the preparation procedure in this exemplary embodiment is different in that the image detection in Step S14 is performed under the pulsed illumination and only the images at the positive peak and the negative peak of the drive signal Cf are detected.

Since the images obtained at Step S14 are images at the positive peak and the negative peak of the drive signal Cf due to such a pulsed illumination, a judgement (detection of the shortest focus position and the longest focus position) of two stepped surfaces 93 on a basis of the image contrast calculation at the next Step S15 can be easily and highly accurately conducted as compared with the above exemplary embodiment using the EDOF image including the image data in other periods of time.

Modification(s)

It should be understood that the scope of the invention is not limited to the above-described exemplary embodiment(s) but includes modifications and improvements compatible with the invention.

In the above exemplary embodiments, the calibration tool 91 having a plurality of stepped surfaces 93 at the equal step height dh is used. However, for instance, in some embodiments, a stepped calibration tool is used in which the step height is small near the reference stepped surface and is increased as being remote from the reference stepped surface. The stepped calibration tool only needs to have multiple height-different parts on a surface. For instance, the stepped calibration tool may be a block having an inclined surface.

However, when the surface of the calibration tool is stepped as described in the above exemplary embodiments, each of the stepped surfaces 93 can have a predetermined area at the same focal length, which is effective in that a reflected light amount can be reliably obtained to reliably and easily calculate the image contrast. Further, the fixed step height dh facilitates calculating the focal length, thereby facilitating manufacturing the calibration tool 91.

The variable focal length lens device 1 usable in the invention is not limited to one having the configurations shown in FIGS. 1 and 5, but any variable focal length lens device including configurations corresponding to the variable focal length lens (the liquid lens unit 3 and the objective lens 2), the image detector 4, the illuminator 5, and the lens controller 6 is usable. The variable focal length lens is not limited to one using the liquid lens system, but any variable focal length lens based on the other principle is usable.

What is claimed is:

1. A calibration method of a variable focal length lens whose focal length is periodically varied in response to a periodic drive signal by using a variable focal length lens device, the variable focal length lens device comprising:
the variable focal length lens;
an illuminator configured to illuminate a measurement target;
an image detector configured to detect an image of the measurement target through the variable focal length lens; and a lens controller configured to output the drive signal to the variable focal length lens and control the illuminator and the image detector, the calibration method comprising:

setting the measurement target in a form of a calibration tool having a plurality of height-different parts on a surface of the calibration tool;

subsequently, preparing a calibration table by repeating outputting from the lens controller the drive signal having a predetermined voltage to the variable focal length lens, detecting a surface image of the calibration tool using the image detector, detecting two points whose image contrast is maximum in the surface image, calculating a focal depth from a difference in a focal length between the two points, and recording the focal depth and the voltage of the drive signal in a corresponding combination, wherein the surface image includes superimposed image data obtained by superimposing a plurality of images at a plurality of focal positions; and retrieving a value of the voltage corresponding to a desired focal depth from the calibration table to set the variable focal length lens at the desired focal depth of the focal depth, and adjusting the voltage of the drive signal to be outputted to the variable focal length lens on a basis of the retrieved value.

2. The calibration method according to claim 1, wherein the calibration tool comprises a plurality of stepped surfaces having a predetermined height on the surface of the calibration tool.

3. The calibration method according to claim 1, wherein the surface image is an EDOF image detected while the illuminator continuously illuminates the measurement target, and the EDOF image is used in preparing the calibration table.

4. The calibration method according to claim 1, wherein the illuminator applies pulsed illumination to the measurement target at a timing corresponding to each of a positive peak and a negative peak of the drive signal; and the image detector detects a surface image of the calibration tool as the measurement target to which the pulsed illumination is applied.

5. A variable focal length lens device comprising:

variable focal length lens whose focal length is periodically varied in response to a periodic drive signal;

an illuminator configured to illuminate a measurement target;

an image detector configured to detect a surface image of the measurement target through the variable focal length lens, the surface image including superimposed image data obtained by superimposing a plurality of images at a plurality of focal positions;

a lens controller configured to output the drive signal to the variable focal length lens and control the illuminator and the image detector; and a calibration controller configured to adjust a voltage of the drive signal outputted by the lens controller, wherein the calibration controller prepares a calibration table by repeating outputting from the lens controller the drive signal having a predetermined voltage to the variable focal length lens, detecting the surface image of the measurement target using the image detector, detecting two points whose image contrast is maximum in the surface image, calculating a focal depth from a difference in a focal length between the two points, and recording the focal depth and the voltage of the drive signal in a corresponding combination, and the calibration controller retrieves a value of the voltage corresponding to a desired focal depth from the calibration table to set the variable focal length lens at the desired focal depth of the focal depth, and adjusts the voltage of the drive signal to be outputted to the variable focal length lens on a basis of the retrieved value.

* * * * *